Patented Feb. 7, 1950

2,496,899

UNITED STATES PATENT OFFICE 2,496,899

AZAMEROCYANINE DYES AND A PROCESS FOR THE PREPARATION THEREOF

Thomas R. Thompson, Binghamton, N. Y., assignor to General Aniline & Film Corporation, New York, N. Y., a corporation of Delaware No Drawing. Application July 16, 1946,
Serial No. 683,975

4 Claims. (Cl. 260—240.4)

This invention relates to azamerocyanine dyes, to a process for the preparation thereof, and the photographic silver-halide emulsions containing the same.

It is known that quaternary salts of heterocyclic nitrogen compounds having various reactive groupings such as amino, imino, acetanilido, and the like, can be condensed with various substances to give dyes of the cyanine type, that is, dyes in which the two nuclei are joined by a mono- or polymethine chain containing one or two nitrogen atoms.

United States Patents 2,080,049–50 describe the preparation of cyadiazine and carbocyazine dyes by condensing a heterocyclic nitrogen base or its quaternary salt having an amino or imino group in the α or γ position to the nitrogen atom thereof with ethyl orthoformate or p-dimethyl-aminobenzaldehyde to give, respectively, compounds characterized by the following formulae:

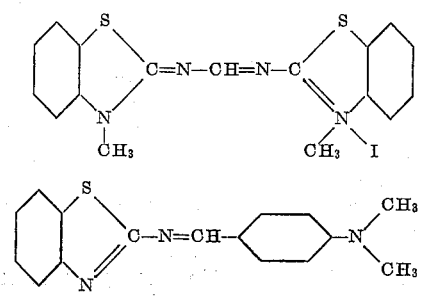

In United States Patent 2,298,732, Brooker et al. have described a process for preparing a polymethine base, without the acid elements, from a hemicyanine dye by means of alkali metal hydroxides, and which base is illustrated by the following formula:

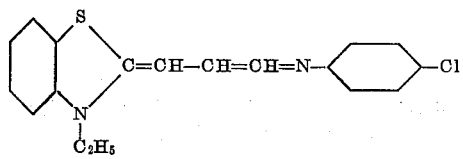

Keyes in his United States Patents 2,186,608 and 2,216,441 has described the condensation of a 6-membered heterocyclic compound containing a secondary nitrogen atom (e. g., piperidine) with a 5-membered keto-methylene heterocyclic compound containing an acetanilido group in the 5-position (e. g., 5-(γ-acetanilidoallylidene)-3-ethylrhodanine), to give a compound represented by the following formula:

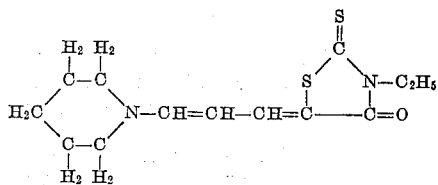

I have now found that a primary amino substituent group in the α-position of a heterocyclic nitrogen quaternary salt is capable of reacting with an acetanilido group of a 5-membered keto-methylene heterocyclic compound to give an analogous series of azamerocyanine dyes having one nitrogen atom in the monomethine chain thereof. Said nitrogen atom is bound to a carbon atom of the methine chain in the form of an azomethine linkage. It is the accepted practice to form compounds containing an azomethine group by the reaction of an aldehyde with a primary amine and this is illustrated by the styryl type dyes of the patents referred to above. It was, therefore, surprising to find that compounds containing such group may also be obtained by reacting an acetanilido-methine group with a primary amino group contrary to the usual practice.

An object of the present invention is to provide azamerocyanine dyes.

A further object is to provide a process for the preparation of said dyes.

A still further object is to provide photographic silver-halide emulsions containing the said dyes.

Other objects will appear hereinafter.

The azamerocyanine dyes prepared according to the present invention are characterized by the following general formula:

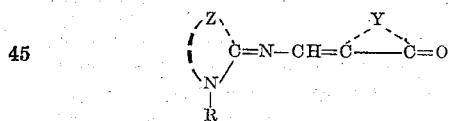

wherein R represents an alkyl or aralkyl group, e. g., methyl, ethyl, propyl, butyl, etc., benzyl, methyl benzyl, ethyl benzyl, and the like, Y represents the atoms necessary to complete a 5-membered heterocyclic nucleus e. g., substituted or unsubstituted rhodanine, and Z represents the atoms necessary to complete a 5-membered or 6-membered heterocyclic nitrogenous nucleus of the type usual in cyanine dyes such as benzoxazole, benzothiazole, benzoselenazole, naphthoxazole, naphthothiazole, oxazole, oxazoline, pyridine, quinoline, selenazole, selenazoline, naphthoselenazole, thiazoline, thiodiazole, and the like.

The process of preparing the above azamerocyanines comprises heating, under reflux conditions, 1 mol of a 2-amino heterocyclic nitrogenous quaternary salt with 1 mol of a 5-membered heterocyclic intermediate derived from rhodanine, having a reactive acetanilido group linked to a carbon atom of a monomethine chain adjacent to a keto group of such intermediate in the presence of a basic condensing agent and a tertiary base as a catalyst.

The 2-amino heterocyclic nitrogenous quaternary salts are represented by the general formula:

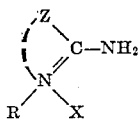

wherein R and Z have the same values as above, and X represents an anionic radical, e. g., Cl, Br, I, $ClO_4$, $SO_4CH_3$, $SO_4C_2H_5$, $SO_3C_6H_4CH_3$, and the like.

As examples of suitable 2-amino heterocyclic nitrogenous quaternary salts may be mentioned 2-aminobenzothiazole, 2-amino-benzoxazole, 2-aminobenzoselenazole, 2 - aminoselenazole, 2-aminoselenazoline, 2-aminooxazoline, 2-amino-4-phenyloxazole, 2-amino-5-methylthiadiazole, 2-amino-5-methyloxdiazole, 2-aminopyridine, 2-aminoquinoline, 2-amino-$\alpha$-naphthothiazole, 2-amino-$\beta$-naphthothiazole, 2 - amino - 5 - ethoxybenzothiazole, 2-aminothiazole, and the like, as the methiodide, ethiodide, propiodide, methyl-p-toluene sulfonate, and the like.

The 5-membered heterocyclic intermediates derived from rhodanine and the methods for their preparation are described in United States Patent 2,186,608 and represented by the general formula:

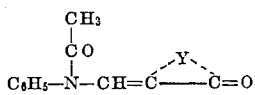

wherein Y has the same value as above. More particularly, the compounds represented by this general formula are as follows:

5-acetanilidomethylene-3-phenylrhodanine
5-acetanilidomethylene-3-ethylrhodanine
5-acetanilidomethylene - 3 - allylrhodanine, and the like.

As condensing agents employed in the preparation of the azamerocyanine dyes of the present invention, there may be employed basic (acid binding) agents, such as pyridine, methyl pyridine, dimethyl pyridine, ethyl pyridine, ethylmethyl pyridine, trimethyl pyridine, quinoline, and the like, with basic catalysts, such as triethylamine, tributylamine, sodium or potassium carbonate. In general, the amount of condensing agent may vary within wide limits, e. g., from 1 to 25 mols. Concentrations ranging from 1 mol to about 15 mols are preferred, however.

When 1 mol of 2-aminobenzothiazole ethiodide is condensed with 1 mol of 5-acetanilidomethylene-3-allyl-rhodanine in the presence of a condensing agent and catalyst such as pyridine and triethylamine, a reaction occurs which may be illustrated as follows:

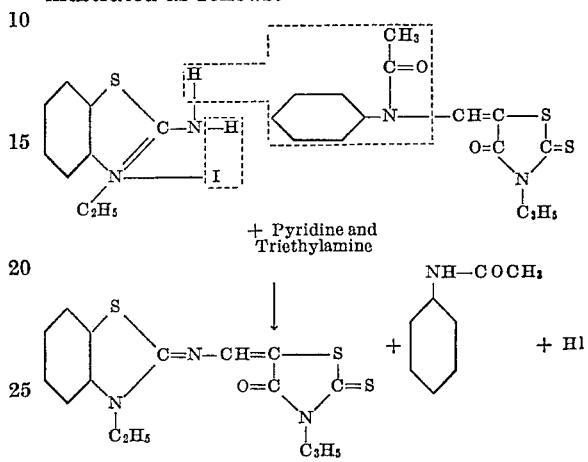

The following examples describe in detail the methods for accomplishing the above objects, but it is to be understood that they are inserted merely for the purpose of illustration and are not to be construed as limitative.

*Example I*

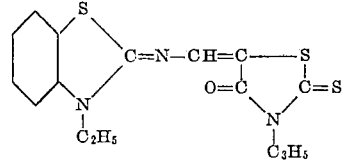

5 - (3-ethyl-2 - benzothiazolylideneiminomethylene)-2-allylrhodanine

A mixture of 4.5 grams of 2-aminobenzothiazole ethiodide, 4.8 grams of 5-acetanilidomethylene-3-allylrhodanine, 50 cc. of pyridine, and 5 cc. of triethylamine was heated at reflux for two hours. The reaction mixture was diluted with three volumes of water, and after cooling overnight, the product was filtered and purified by boiling out with methanol. Further purification was obtained by crystallization from a methanol-dioxane mixture. The melting point was 197-199° C., with a yield of 3.0 grams (83% of the theoretical). A silver chloride photographic emulsion was sensitized with a maximum at 520 m$\mu$.

*Example II*

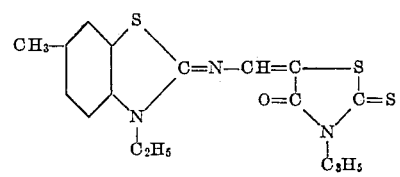

5-(3-ethyl -6- methyl -2- benzothiazolylideneiminomethylene)-2-allylrhodanine

A mixture of 2.5 grams of 2-amino-6-methyl-benzothiazole ethiodide, 2.5 grams of 5-acetanilidomethylene-3-allylrhodanine, 25 cc. of pyridine and 3 cc. of triethylamine was heated at reflux for two hours. The product crystallized from the reaction mixture on cooling. After boiling out with methanol, the orange crystals melted at 247–249° C., and sensitized a silver chloride photographic emulsion with a maximum of sensitivity at 525 mμ.

Example III

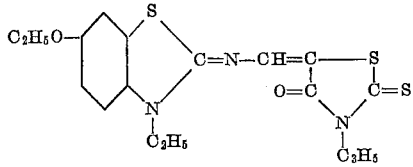

5 - (3 - ethyl-6-ethoxy-2-benzothiazolylideneiminomethylene) -3-allylrhodanine

A mixture of 5.0 grams of 2-amino-6-ethoxybenzothiazole ethiodide, 5.0 grams of 5-acetanilidomethylene-3-allylrhodanine, 40 cc. of pyridine, and 5 cc. of triethylamine was heated at reflux for two hours. The reaction mixture was diluted with three volumes of water and the precipitated product purified by boiling out with methanol. After crystallization from a methanol-dioxane mixture, the orange crystals melted at 187–188° C. This dye sensitized a photographic silver chloride emulsion with a sensitization maximum at 540 mμ.

Example IV

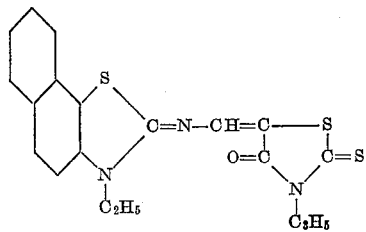

5-(3-ethyl-6,7-benzo -2- benzothiazolylideneiminomethylene)-3-allylrhodanine

One gram of 2-amino-α-naphthothiazole ethiodide, 0.95 gram of 5-acetanilidomethylene-3-allylrhodanine, 15 cc. of pyridine, and 3 cc. of triethylamine was heated at reflux for two hours. Two volumes of water were added, and after cooling, the dye separated in the form of crystals. Purification was effected by boiling out with methanol, yield 0.4 gram. This dye extends the sensitivity of a silver chloride emulsion to 570 mμ with a maximum at 535 mμ.

Example V

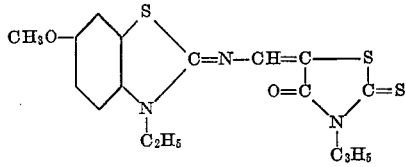

5-(3-ethyl -6- methoxybenzothiazolylideneiminomethylene)-3-allylrhodanine

A mixture of 0.64 gram of 2-amino-6-methoxybenzothiazole ethiodide, 0.64 gram of 5-acetanilidomethylene-3-allylrhodanine, 15 cc. of pyridine, and 3 cc. of triethylamine was heated at reflux for two hours. The dye separated on cooling and was purified by boiling out with methanol. The dye in the form of orange crystals melted at 207–208° C., and sensitized a silver chloride photographic emulsion to 565 mμ, with a maximum at 530 mμ.

Example VI

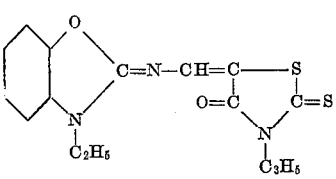

5 - (3 - ethyl - 2 - benzoxazolylideneiminomethylene) -3-allylrhodanine

A mixture of 0.4 gram of 2-aminobenzoxazole ethiodide, 0.4 gram of 5-acetanilidomethylene-3-allylrhodanine, 10 cc. of pyridine, and 2 cc. of triethylamine was heated at reflux for two hours. The dye was precipitated by addition of three volumes of water and purified by boiling out with methanol. Yellow crystals, melting point 154–156° C., were obtained. The sensitivity of a photographic chloride emulsion is extended to 500 mμ with a maximum at 470 mμ upon addition of said dye.

Example VII

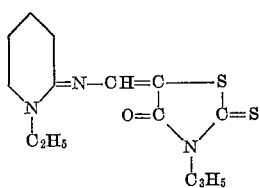

5-(1-ethyl - 2 - pyridylideneiminomethylene) - 3 - allylrhodanine

A mixture of 5.4 grams of 2-aminopyridine ethyl p-toluenesulfonate, 5.8 grams of 5-acetanilidomethylene-3-allylrhodanine, 20 cc. of pyridine, and 5 cc. of triethylamine was heated at reflux for two hours. The dye was precipitated by the addition of three volumes of water and purified by boiling out with methanol. Yield 5 grams, melting point 138–140° C.

Example VIII

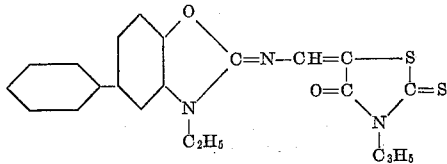

5 - (3-ethyl-5-phenyl-2-benzoxazolylideneiminomethylene) -3-allylrhodanine

A mixture of 1.8 grams of 2-amino-5-phenylbenzoxazole ethiodide, 1.6 grams of 5-acetanilidomethylene-3-allylrhodanine, 15 cc. of pyridine, and 3 cc. of triethylamine was heated at reflux for two hours. Two volumes of water were added, and after cooling overnight crystals were obtained which were further purified by boiling out with methanol. The yellow crystals melted at 248–249° C., and sensitized a silver chloride photographic emulsion with a maximum at 490 mμ.

Example IX

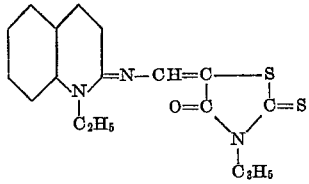

5-(1-ethyl-2-quinolinylideneiminomethylene)-3-allylrhodanine

A mixture of 0.4 gram of 2-aminoquinoline ethiodide, 0.4 gram of 5-acetanilidomethylene-3-allylrhodanine, 10 cc. of pyridine, and 2 cc. of triethylamine was heated at reflux for two hours. The product was purified by boiling out with methanol. It melts at 219–220° C. This dye sensitizes a photographic bromide emulsion with a maximum at 530 mμ.

In the preparation of emulsions containing these azamerocyanine dyes, the dye may be dissolved in methyl or ethyl alcohol containing from 5 to 50 milligrams of the dye added to a liter of emulsion. While in general practice it may not be necessary to add the dye in amounts larger than those given above, generally, for satisfactory results, amounts ranging from 5 to 25 milligrams are sufficient to obtain the maximum sensitizing effect. However, I do not wish to limit myself to the quantities just indicated, as the most suitable amounts will in each case be found by a few comparative experiments. The dyes may be added to the emulsion in the form of a solution. Suitable solvents may be the alcohols, for instance, methyl or ethyl alcohol, which may be anhydrous or diluted with a small volume of water. In actual practice, the dyes are applied to the emulsion during any stage of its production. However, they are preferably added to the finished emulsion before being cast.

While there have been pointed out above certain preferred embodiments of the invention, the same is not limited to the foregoing examples, illustrations or to the specific details given therein, but is capable of variations and modifications as to the reactants, proportions and conditions employed. Accordingly, it is intended that the invention be defined only by the accompanying claims in which it is intended to include all features of patentable novelty residing therein.

I claim:

1. An azamerocyanine dye characterized by the following general formula:

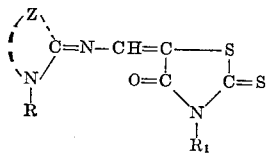

wherein R represents a member selected from the class consisting of alkyl and aralkyl groups, $R_1$ represents a member selected from the class consisting of alkyl, allyl, and phenyl groups, and Z represents the atoms necessary to complete a heterocyclic nitrogenous system of the type used in the prepartion of cyanine dyes.

2. An azamerocyanine dye having the following formula:

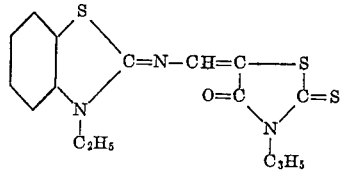

3. An azamerocyanine dye having the following formula:

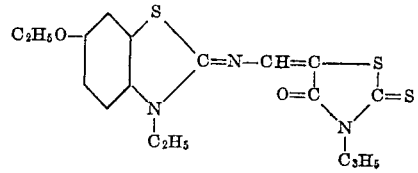

4. An azamerocyanine dye having the following formula:

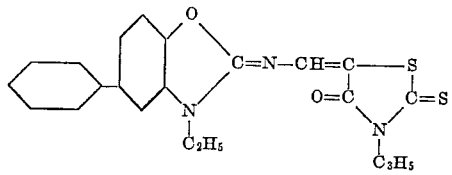

THOMAS R. THOMPSON.

REFERENCES CITED

The following references are of record in the file of this patent:

UNITED STATES PATENTS

| Number | Name | Date |
|---|---|---|
| 2,165,339 | Brooker | July 11, 1939 |
| 2,170,804 | Brooker | Aug. 29, 1939 |
| 2,185,182 | Brooker | Jan. 2, 1940 |
| 2,216,441 | Keyes | Oct. 1, 1940 |
| 2,394,068 | Kendall | Feb. 5, 1946 |

FOREIGN PATENTS

| Number | Country | Date |
|---|---|---|
| 514,621 | Great Britain | 1939 |